April 30, 1957    J. A. DEL FRANCIA    2,790,434
BROILER
Filed June 16, 1951    2 Sheets-Sheet 1
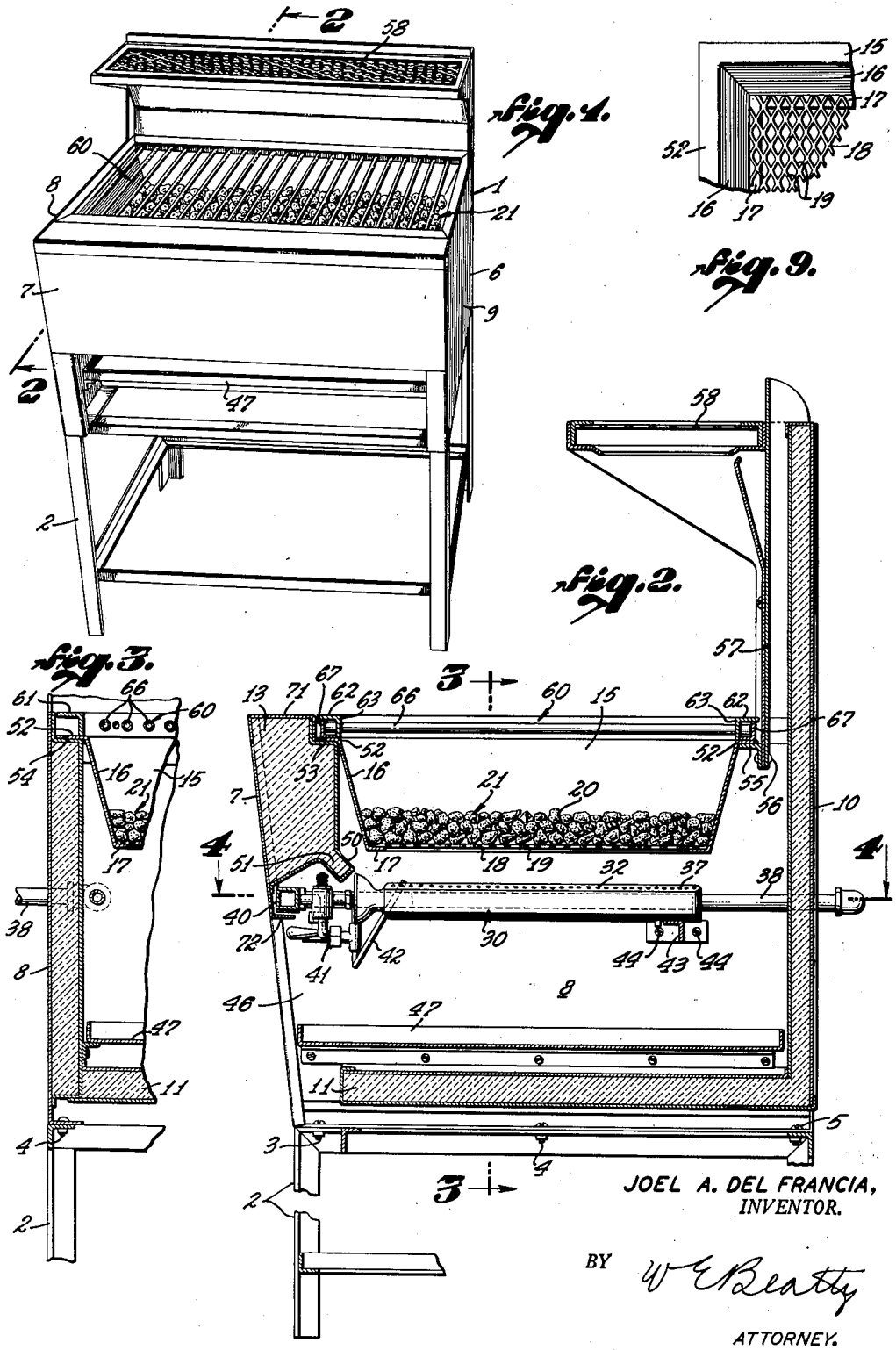
JOEL A. DEL FRANCIA,
INVENTOR.
BY W. E. Beatty
ATTORNEY.

April 30, 1957 J. A. DEL FRANCIA 2,790,434
BROILER
Filed June 16, 1951 2 Sheets-Sheet 2
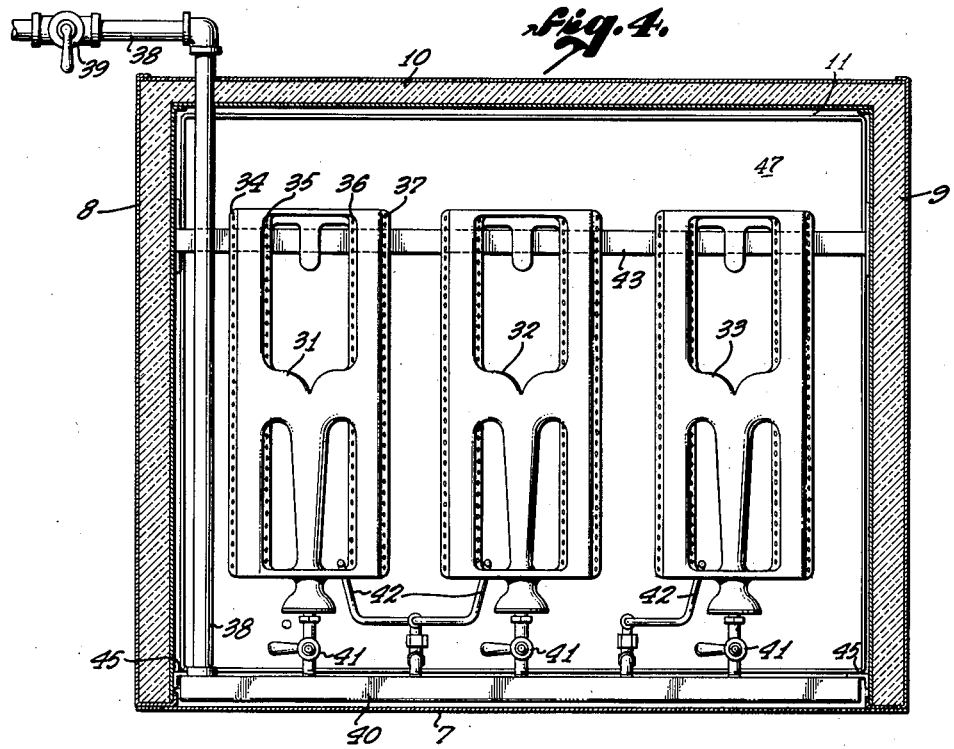
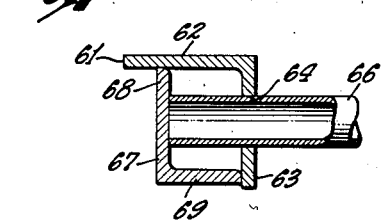
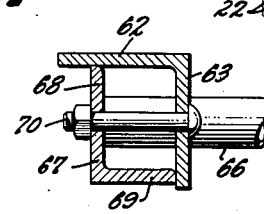
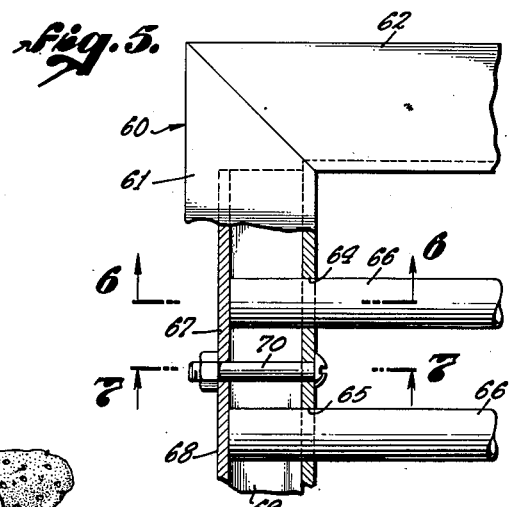
JOEL A. DEL FRANCIA,
INVENTOR.
BY W. E. Beatty
ATTORNEY.

United States Patent Office
2,790,434
Patented Apr. 30, 1957

2,790,434

BROILER

Joel A. Del Francia, Alhambra, Calif., assignor to Delux Range Company, Alhambra, Calif., a corporation of California Application June 16, 1951, Serial No. 231,960

4 Claims. (Cl. 126—41)

The invention relates to a broiler particularly intended for broiling meat or fish.

A charcoal broiler is well known, but has a number of disadvantages, including the following: it takes a long time to start a charcoal fire, the charcoal is expensive and is consumed and must be replaced, and storage space must be provided for a supply of charcoal. These disadvantages apply whether a broiler is used in the home or in a hotel or restaurant, although in the latter case the item of expense is of greater importance and it is customary to employ one who is particularly skilled in operating a charcoal broiler, as the fire must be banked and the dampers closed when no customer's orders are to be filled, and in order to avoid wasting the expensive charcoal this requires that when the fire is needed it has to be unbanked and the dampers opened in order to bring the fire up to temperature, involving a loss of time.

All of the above disadvantages are overcome according to the present invention by employing a gas burner as a primary source of heat which is employed to heat a bed of ceramic material which becomes a secondary source of radiant heat for cooking or heating any desired article of food or otherwise.

For the ceramic bed the invention provides pieces of ceramic material such as fire brick having voids or being porous. While such brick has been used heretofore, for heat insulation purposes according to the invention it is used as a heater and has the advantage that it can be brought up to temperature faster than solid brick. Also use of broken pieces of such ceramic material provides a number of spaces for the frame to enter which facilitates heating the bed which glows, at least at the bottom of the bed and generally resembles a charcoal fire.

When making a charcoal fire for home use it is customary to start the fire about 45 minutes before hand, this time being required to obtain a bed of coals. On the otherhand, the fire bed of the present invention can be brought up to a desired high temperature such as 1000° F. in seven minutes. Also the temperature of the ceramic bed can be regulated by the usual valve for the gas burner.

A further feature of the invention results in a stove or broiler of novel construction providing for replacement or repair of the grill and fire box and for heat insulation of the gas valve.

For further details of the invention, reference may be made to the drawings wherein Fig. 1 is a perspective view of a broiler according to the present invention.

Fig. 2 is an enlarged vertical sectional view on line 2—2 of Fig. 1.

Fig. 3 is a sectional view on line 3—3 of Fig. 2.

Fig. 4 is a horizontal sectional view on line 4—4 of Fig. 2.

Fig. 5 is an enlarged plan view, partly in section and with parts broken away of one end of the grill and its support.

Figs. 6 and 7 are sectional views on lines of the corresponding number of Fig. 5.

All sections are looking in the direction of the respective arrows.

Fig. 8 is a perspective view of one of the pieces of the ceramic bed.

Fig. 9 is a partial plan view of the grate which supports the ceramic bed.

Referring in detail to the drawings, the broiler 1 is illustrated as mounted on a stand 2, being fastened by bolts like 3, 4, and 5, in Figs. 2 and 3. The broiler 1 has a sheet metal casing 6 having a front wall 7, end walls 8 and 9, rear wall 10 and a bottom wall 11. The walls 7 to 11 are hollow and provided with a filling of heat insulating material such as asbestos, is indicated at 13 in Fig. 2, for the front wall 7.

The fire box 15, has inwardly and downwardly sloping sheet metal sides like 16, having an inwardly extending bottom flange 17, providing a support for the grate 18. As shown in Fig. 9, the grate 18 is an expanded stainless steel grid having openings like 19, which are smaller than the pieces 20 of the ceramic bed 21.

As shown in Fig. 8, the ceramic pieces 20 are porous, or have voids as indicated at 22 and they may be made by breaking a brick of porous fire clay into pieces about one or two inches in size. Such brick may for example be K–23 fire insulating brick made by Babcock and Wilcox Co. This brick is very light weight and may be made by mixing fire clay with sawdust or other combustible solids and firing, whereupon the combustible material is consumed by the fire, having voids as indicated at 22 in Fig. 8.

The broken pieces like 20 have an irregular outline, providing many air channels through the bed 21 for passage of flame and heat from the gas burner 30 arranged below and close to the grade 18. The burner 30, as shown in Fig. 4 may comprise a plurality of burners, three being shown as indicated at 31, 32 and 33. Each of the burners like 31 has a plurality of rows of holes for the gas, four rows being indicated at 34, 35, 36 and 37, to substantially, uniformly heat the bed 21. Gas is supplied from a pipe 38 having a main valve 39 which leads to a manifold 40. Each of the burners 31 to 33 has a valve like 41 and a pilot like 42.

The rear ends of the burners 31 to 33 are supported by an angle strip 43 suitably fastened to the end walls 8 and 9 by welds or bolts indicated at 44 in Fig. 2, while the ends of the manifold 40 are supported by outwardly extending brackets 45 on side walls 8 and 9. The front wall 7 and flange 72 terminate above the bottom wall 11, leaving an opening 46 for access to the valves like 41 and for admission of air to the burners 31 to 33 and for access to the drip pan 47. If the bed 21 or at least the bottom layer of the bed is maintained at a red heat, no liquid grease from meat reaches the pan 47. Only a very few small pieces of carbonized material or perhaps a small piece, of the ceramic 20 fall into the pan 47. It may be used to heat dishes or cooking vessels if so desired.

The front wall 7 has an extension 50 as shown in Fig. 2, behind all of the valves like 41 to protect them from the heat of the burners 31 to 33 and particularly to protect them from the heat of the bed 21. The extension 50 is hollow and has a filling of the heat insulating material 13 as indicated at 51.

The fire box 15 at its upper end has an outwardly extending flange 52 supported by a depressed rim or shelf 53 in a recess at the rear top of the front wall 7. The shelf or rim 53 is a horizontal wall portion at the rear of the hollow front wall 7. The opposite ends of the fire box 15 are supported by a similar rim or shelf as shown at 54 in Fig. 3 for the side wall 8, and the opposite wall 9 being similarly arranged. The rear of the flange 52 is supported by a shelf in the form of an angle strip 55, secured by rivets or the like as indicated at 56 to the metal back 57 spaced in front of the rear wall 10. The metal back 57, as shown in Fig. 2, terminates near the top of the fire-box 15, and particularly above the burner 30, whereby the upright space between the back 57 and the rear wall 10 communicates with the space above burner 30, so that products of combustion from the burner 30 will pass upwardly above grill 60 through the space between the back 57 and the rear wall 10. The back has an expanded metal shelf 58 for making toast, or heating dishes, or the like.

The fire box 15 is removable as it rests in position shown by gravity. At the top of the fire box 15 is a removable grill 60. As shown in Figs. 5, 6, and 7, the grill 60 comprises a rectangular frame 61 of angle iron whereof the horizontal flange like 62 extends outwardly and forms the top margin of the frame with an inner downwardly extending flange 63 having spaced holes like 64 and 65 removably receiving the grid elements like 66 which may be of hollow pipe. The grid elements like 66 are held in position at their opposite ends by an angle strip like 67, having a vertical flange 68, which forms an abutment for the ends of the grid elements like 66 and an inwardly extending flange like 69 which serves as a spacer. The angle member 67 is removably held to the frame 61 by bolts like 70. As shown in Fig. 2, the flange 62 for the frame 61 extends flush with the top 71 of the front wall 7.

The burners 31 to 33 provide a rectangular array of gas flames, to substantially uniformly heat the rectangular fire bed 21.

The device here shown has been constructed and operated and numerous comparisons have been made between meat cooked on a charcoal broiler and on the broiler of this invention. These tests have shown that meat and other food cooked on the broiler of this invention has all of the smoky tang and appetizing flavor of a charcoal broiler. This broiler of the present invention has many advantages as pointed out above.

Various modifications may be made in the invention without departing from the spirit of the following claims.

For example, solid ceramic pieces may be used instead of pieces having voids, although the latter are preferred as the bed heats up faster. Also the shape and number of the gas burners may be varied as desired.

I claim:

1. A broiler comprising a casing having hollow front and side walls, each of said walls comprising an inner wall member having a horizontal wall portion providing a shelf, a grill fitting said shelf, a fire-box for refractory material, said fire-box having a flange fitting on said shelf, a burner, means supporting said burner below and in heating relation to the bottom of said fire-box, said casing having a hollow rear wall extending below said burner, heat insulating material in all of said walls of said casing, a metal back for said casing in front of and spaced from said rear wall, said back and said rear wall extending above said grill, said metal back having a flange supporting the rear of said grill, said metal back terminating above said burner, said casing below said front walls having an air opening for said burner.

2. A broiler comprising a casing having a hollow front wall comprising inner and outer wall members, said inner wall member having a depressed offset top wall portion providing a shelf, a grill having a frame fitting said shelf substantially flush with the top of said front wall, a fire-box for refractory material, said fire-box having a flange fitting on said shelf, a burner, means supporting said burner below and in heating relation to the bottom of said fire-box, said casing having a hollow rear wall, heat insulating material in said walls of said casing, a metal back for said casing in front of and spaced from said rear wall, said back and said rear walls extending above said grill, said metal back having a flange supporting the rear of said grill frame, said metal back terminating above said burner, said casing, below said front, having an air opening for said burner.

3. A broiler comprising a casing having front, rear and side walls and a metal back spaced from the front of said rear wall, a depressed shelf in the top of said front and side walls and at the bottom of said metal back, a fire-box suspended on and extending below said shelf, said fire-box having a bottom grate for a refractory bed, a grill at the top of said fire-box above said bed, a burner support extending between said side walls below said fire-box, a manifold extending across said front wall and a plurality of burners extending between said manifold and said support and arranged below the bottom of said fire-box.

4. A broiler comprising a casing having hollow front and side and rear walls each having insulating material therein, each of said front and side walls comprising inner and outer wall members having a top wall member constituting a shelf, said front wall having a lower end terminating at an elevated position above the lower ends of said side and rear walls, a firebox having a flange fitting on said shelf, a grill fitting on said flange, said grill having a top substantially flush with the top of said front and side walls, said firebox having a bottom having a grate, a gas burner spaced from and under said grate, and means supporting said gas burner substantially at the level of the bottom of said front wall, said broiler having legs supporting said walls with an air opening for said broiler at the front of said broiler below said front wall.

References Cited in the file of this patent

UNITED STATES PATENTS

| | | |
|---|---|---|
| 310,948 | Jackson | Jan. 20, 1885 |
| 384,365 | Jackson | June 12, 1888 |
| 868,753 | Barrett | Oct. 22, 1907 |
| 1,210,536 | Ripper | Jan. 2, 1917 |
| 1,344,136 | Kobe | June 22, 1920 |
| 1,475,587 | Leonard | Nov. 27, 1923 |
| 1,630,644 | Troiel | May 31, 1927 |
| 1,764,719 | Gercich | June 17, 1930 |
| 2,007,446 | Hollman | July 9, 1935 |
| 2,013,802 | Hobson | Sept. 10, 1935 |
| 2,304,140 | Bergholm | Dec. 8, 1942 |
| 2,375,913 | Gibert | May 15, 1945 |
| 2,600,234 | Foley | June 10, 1952 |